United States Patent
Bensaou et al.

(10) Patent No.: US 6,934,297 B1
(45) Date of Patent: Aug. 23, 2005

(54) METHOD AND APPARATUS FOR COMMUNICATING IN A DISTRIBUTED MULTIPLE ACCESS WIRELESS COMMUNICATION SYSTEM

(75) Inventors: Brahim Bensaou, Kowloon (HK); Yu Wang, Santa Cruz, CA (US)

(73) Assignee: Agency for Science, Technology and Research, Singapore (SG)

(*) Notice: Subject to any disclaimer, the term of this patent is extended or adjusted under 35 U.S.C. 154(b) by 872 days.

(21) Appl. No.: 09/704,807

(22) Filed: Nov. 2, 2000

(51) Int. Cl.[7] .......................................... H04L 12/413
(52) U.S. Cl. .................. 370/445; 370/348; 370/443; 455/450; 455/451; 455/452.1
(58) Field of Search ................. 370/331, 323, 370/335, 337, 338, 342, 402, 442, 443–448, 370/455, 462, 348; 455/434, 450, 451, 452.1

(56) References Cited

U.S. PATENT DOCUMENTS

| | | | |
|---|---|---|---|
| 6,031,832 A * | 2/2000 | Turina ........................ 370/348 |
| 6,157,614 A * | 12/2000 | Pasternak et al. ........... 370/236 |
| 6,295,285 B1 * | 9/2001 | Whitehead ................... 370/329 |
| 6,418,136 B1 * | 7/2002 | Naor et al. .................. 370/347 |
| 6,452,915 B1 * | 9/2002 | Jorgensen ................... 370/338 |
| 6,556,582 B1 * | 4/2003 | Redi ........................... 370/443 |
| 6,654,363 B1 * | 11/2003 | Li et al. ...................... 370/338 |
| 6,751,196 B1 * | 6/2004 | Hulyalkar et al. .......... 370/252 |
| 6,768,730 B1 * | 7/2004 | Whitehill .................... 370/348 |

* cited by examiner

*Primary Examiner*—Wellington Chin
*Assistant Examiner*—Chuong Ho
(74) *Attorney, Agent, or Firm*—Ladas & Parry LLP

(57) ABSTRACT

A communication unit (110) that wants to transmit a data packet to another communication unit (105) must acquire access to a common communication channel (not shown) before transmitting a data packet (440). For data packets of realtime applications, quality of service (QOS) parameters for the data packet are used to define transmission parameters to communicate the data packet (440). These parameters include $T_{access}$ (420) and $T_{delay}$ (430). In addition, compliance with predetermined requirements of size relationship between request-to-send (RTS) and clear-to-send (CTS) packets are imposed.

9 Claims, 6 Drawing Sheets

METHOD AND APPARATUS FOR COMMUNICATING IN A DISTRIBUTED MULTIPLE ACCESS WIRELESS COMMUNICATION SYSTEM

FIELD OF THE INVENTION

The present invention relates to communicating data packets in a distributed multiple access wireless communication system in general, and more particularly to communicating data packets on a common communication channel in such a communication system.

BACKGROUND OF THE INVENTION

As is known, distributed multiple access communication systems include dynamic multi-hop wireless communication systems, which are particularly useful in adhoc networking. In such a system, communication units, very often comprising mobile units, share a common communication channel without a network controller to manage allocation of the common communication channel. In addition, such systems are self-configurable and therefore can be installed quickly where temporary communications is required, such as in emergency operations.

In order to share the common communication channel among the communication units, an efficient communication channel access control protocol, also referred to as a medium access control (MAC) protocol, is required. In addition, the MAC protocol must also address a problem known as "hidden terminal".

The hidden terminal problem arises when, due to the limited transmission range of the communication units, multiple transmitting communication units within range of a common receiving communication unit may not receive each others concurrent transmissions, and thus, in effect, are "hidden" from one another. Consequently, when the transmitting communication units transmit to the same receiver at approximately the same time, the transmitting units are not aware when their transmissions collide at the receiving communication unit. The hidden terminal problem is known to significantly degrade throughput of the communication system. Further, due to their multi-hop characteristics, a dynamic multi-hop wireless communication system suffers much more from the hidden terminal problem than, for example, a wireless local area network (LANs) system.

A MAC protocol known as Multiple Access Collison Avoidance (MACA) has been used in a dynamic multi-hop wireless communication system, to allow the common communication channel to be shared, and also to alleviate the hidden terminal problem. This has resulted in significant improvement in throughput in the communication system. The MACA protocol implements an exchange of Request-to-Send (RTS) and Clear-to-Send (CTS) messages between a pair of transmitting and receiving communication units, prior to transmission of a data packet. The MACA protocol forms the basis for several more sophisticated protocols. One example is a protocol known as Floor Acquisition Multiple Access with Non-persistent Carrier Sensing (FAMA-NCS), which is substantially immune to the hidden terminal problem and can achieve good throughput.

In wireless LAN, the IEEE 802.11 specification proposes a MAC protocol called Distributed Foundation Wireless Medium Access Control (DFWMAC) for wireless ad hoc LANs. The DFWMAC protocol provides basic and RTS/CTS access method. Here, the RTS/CTS access method comprises a four-way dialog which includes the sequential communication of control packets and data packets, where RTS, CTS and ACK (acknowledgement) packets are control packets. In sequence, the control and data packets are transmitted as follows: RTS-CTS-DATA-ACK between two communication units on the common communication channel. The DFWMAC protocol, however, does not prevent the data packets from colliding with the control packets and/or other data packets. To alleviate the adverse effects of such collisions, the DFWMAC protocol uses a sophisticated modified binary exponential backoff scheme to resolve collisions.

The MACA and DFWMAC protocols are useful in non-realtime applications such as file transfer where the need for communicating time sensitive data packets is minimal. Presently, there is a growing need for such systems to support real time applications such as voice and even video. Consequently, the data packets for realtime applications need to be conveyed more quickly than for example data packets carrying information for file transfer.

In a known proposal for wireless LAN system, to differentiate data packets of realtime applications from data packets that are not, quality of service (QOS) parameters associated with the data packets of realtime applications are used when communicating those data packets. Stations on the LAN with real-time data packets in a transmission queue jam the common communication channel with, what is known as, Black Bursts (BB). The QOS parameters reflect the urgency with which the realtime data packets should be communicated, and duration of BB are determined in accordance with the QOS and is proportional to the delay incurred by the data packets. The station that transmits the BB with the longest duration gets access to the common communication channel, and can then transmit a data packet from its transmission queue. However, this approach fails when hidden terminals exist as those hidden terminals may experience the same delay, and each BB contention period is not guaranteed to result in a unique winner. Thus, real-time data packets will still suffer from collisions if this method were to be used in a dynamic multi-hop wireless communication system.

Another MAC protocol, GAMA (Group Allocation Multiple Access), schedules real-time and non-real-time or so called datagram traffic in a single-hop wireless ad-hoc LAN. The GAMA protocol includes a contention period, during which stations can transmit a request to join a transmission group, and a contention-free period, during which stations in a transmission group take turns to transmit data packets. Again, this approach does not work well if hidden terminals exist. This is because when hidden terminals do not join the transmission group that they may interfere with, then the GAMA protocol cannot ensure that data packets will be free from collision. When hidden terminals do join the transmission group to avoid collision, then all other stations in the LAN have to join the same transmission group one by one. It would be difficult to maintain such a global group in a dynamic multi-hop wireless communication system due to the dynamic nature of the system. Another drawback is the benefit from spatial reuse of communication channels would be limited.

Further, the wireless LAN protocols described above do not support ad hoc routing because in a wireless LAN system a wireless access point can reach all other stations and can relay data packets. In contrast, in a dynamic multi-hop wireless communication system, there is no common access point, hence, routing is another concern.

In addition, unlike in conventional wired networks, a communication unit that acts as a router in a dynamic multi-hop wireless communication system, typically has a single network interface i.e. there are no separate links for the communication unit to route data packets or exchange routing information. This is a particular concern when some communication units in a dynamic multi-hop wireless communication system act as cluster heads or belong to the core of a routing structure. In such circumstances, more traffic will transit through such communication units, in addition to data packets of its own, and therefore, such communication units should have a higher priority in accessing the communication channel to route data packets between other communication units relative to data packets of its own.

Therefore, the LAN protocols discussed above are not directly applicable in a dynamic multi-hop wireless communication system, and although there are existing MAC protocols for dynamic multi-hop wireless communication system, these MAC protocols do not address both the hidden terminals problem and take into account the requirements of communicating time sensitive data packets to support real-time applications.

BRIEF SUMMARY OF THE INVENTION

The present invention therefore seeks to provide a method and apparatus for communicating data packets on a common communication channel in a distributed multiple access wireless communication system, which overcomes, or at least reduces the above mentioned problems of the prior art.

Accordingly, in one aspect, the invention provides a method for communicating at least one data packet between a first and a second of a plurality of communication units on a common communication channel in a distributed multiple access wireless communication system, the method comprising the steps of:
   a) providing the at least one data packet to the first communication unit for transmission by the first communication unit to the second communication unit;
   b) providing at least one quality of service (QOS) parameter to the first communication unit, wherein the at least one QOS parameter is associated with the at least one data packet;
   c) the first communication unit determining at least a first transmission parameter from the at least one quality of service parameter;
   d) the first communication unit transmitting a transmit request message in accordance with the at least the first transmission parameter;
   e) the second communication unit transmitting a transmit grant message in response to receiving the transmit request message; and
   f) in response to the first communication unit receiving the transmit grant message from the second communication unit, the first communication unit transmitting the at least one data packet.

In another aspect, the present invention provides a method in a first of a plurality of communication units for transmitting at least one data packet to a second of the plurality of communication units on a common communication channel in a distributed multiple access wireless communication system, the method comprising the steps of:
   a) providing the at least one data packet for transmission to the second of the plurality of communication units;
   b) providing at least one quality of service parameter, wherein the at least one preferred communication quality parameter is associated with the at least one data packet;
   c) determining at least a first transmission parameter from the at least one quality of service parameter;
   d) transmitting the transmit request message in accordance with the at least the first transmission parameter; and
   e) in response to receiving a transmit grant message from the second communication unit, the first communication unit transmitting the at least one data packet.

In yet another aspect the present invention provides a method for communicating at least one data packet in a distributed multiple access wireless communication system, the method comprising the steps of:
   a) providing at least one data packet for transmission in the distributed multiple access wireless communication system;
   b) providing at least one quality of service parameter;
   c) determining a delay time and an access time from the at least one quality of service parameter;
   d) packetising a request to transmit message which includes the delay time;
   e) transmitting the request to transmit message after the access time has elapsed;
   f) receiving the request to transmit data packet;
   g) transmitting a clear to transmit message after the delay time has elapsed;
   h) receiving the clear to transmit message;
   i) transmitting the at least one data packet;
   j) receiving the at least one data packet;
   k) transmitting an acknowledge message;
   l) receiving the acknowledge message.

An additional aspect of the present invention provides a communication unit for communicating data packets to another communication unit on a common communication channel in a distributed multiple access wireless communication system, the communication unit comprising:
   a) a data input for receiving at least one data packet for transmission to the another communication unit;
   b) a quality of service (QOS) input for receiving at least one quality of service parameter, wherein the QOS is associated with the at least one data packet;
   c) a wireless receiver coupled to receive incoming control and data packets on the common communication channel, and having an output for providing the control and data packets;
   d) a decoder having an input coupled to the output of the wireless receiver for receiving the incoming control and data packets, the decoder having a first output for providing the incoming control packets, and having a second output coupled to provide the incoming data packets to a data output;
   e) a controller coupled to the QOS input, the controller having an input coupled to the first output of the decoder for receiving incoming control packets, the controller for generating outgoing control packets in accordance with the at least one quality of service parameter and the incoming control packets, and the controller having an output for providing the outgoing control packets;
   f) an encoder having a first input coupled to the output of the controller for receiving the outgoing control packets, the encoder having a second input coupled to the data input for receiving the at least one outgoing data packet, and the encoder having an output for providing the outgoing control packets and the at least one outgoing data packet; and
   g) a transmitter having an input coupled to the output of the encoder for receiving the outgoing control packets and the at least one outgoing data packet, and the transmitter having an output adapted to transmit the outgoing control packets and the outgoing at least one data packet on the common communication channel.

BRIEF DESCRIPTION OF THE DRAWINGS

An embodiment of the present invention will now be more fully described, by way of example, with reference to the drawings of which.

DETAILED DESCRIPTION OF THE DRAWINGS

Throughout the following description, processing time and transmit-to-receive turnaround time of communication units are ignored. However, it will be appreciated by those skilled in the art, that consideration for the processing time and transmit-to-receive turnaround time of the communication units may be incorporated without adversely affecting the operation of the communication system as described herein.

In addition, definitions of notation that are used in the description follow:

| | |
|---|---|
| rtPacket: | data packet with QOS parameters; |
| nrtPacket: | data packet without QOS parameters; |
| $T_d$: | maximum one-hop channel propagation delay time; |
| $T_{rts}$: | time to transmit a RTS packet; |
| $T_{cts}$: | time to transmit a CTS packet; |
| $T_{data}$: | time to transmit a data packet; |
| $T_{ack}$: | time to transmit an ACK packet; |
| $T_{delay}$: | delay time to reply to an RTS; |
| $T_{left}$: | time left for a rtPacket to be delivered; |
| $T_{max}$: | maximum time to complete one successful RTS-CTS-data packet-ACK transmission; |
| $T_{access}$: | time allowed to sense a common communication channel is idle before transmitting an RTS packet; |
| $T_{defer}$: | maximum time a communication unit should defer access to a common communication channel after detecting a collision before entering a backoff process. $T_{defer}$ is determined by $T_{data} + 3 * Td$; |
| $T_{unit}$: | time used as a factor to map packet delay requirement to backoff timer. Note that time is defined in terms of this unit. (e.g. millisecond or microsecond, or 10 microsecond) it depends on the accuracy and the granularity of the hardware clock; |
| $N_{lost}$: | number of data packets dropped during a communication session; |
| $N_{sent}$: | number of data packets sent during a communication session; and |
| PLR: | packet loss ratio. |

Further, the following time conditions are imposed:

$$T_{rts} > 2*Td \quad (1)$$

$$T_{cts} > T_{rts} + 2*T_d \quad (2)$$

Figure 1:
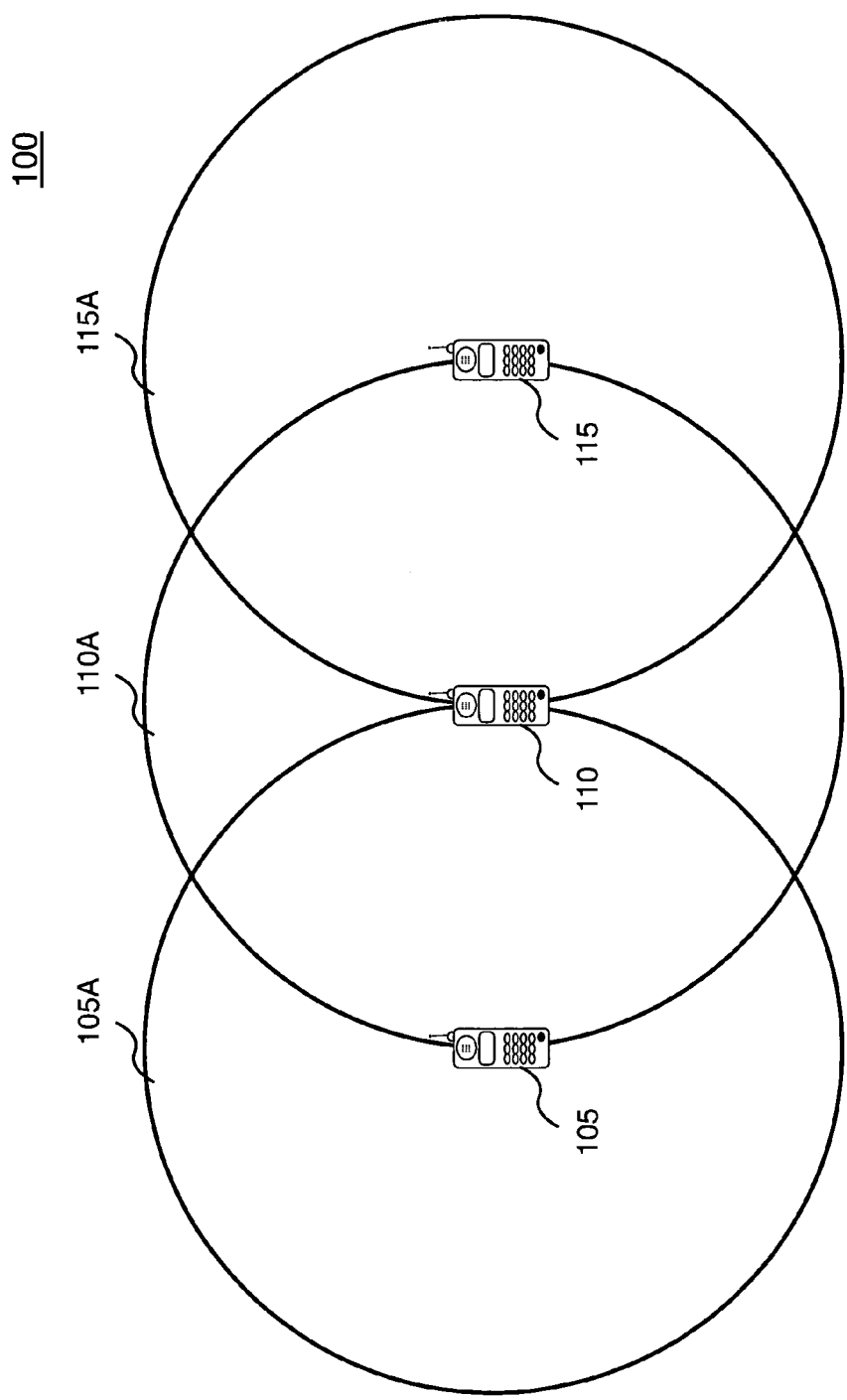
FIG. 1 shows a communication system in accordance with the present invention.

With reference to FIG. 1, three communication units 105, 110 and 115 are operating on a communication channel of a distributed multiple access communication system 100. The three communication units each have communication coverage areas 105A, 110A and 115A, respectively, where the communication unit 110 can communicate with the communication units 105 and 115, but where the communication units 105 and 115 are not able to communicate directly with each other i.e. the communication units 105 and 115 are "hidden" from each other.

Figure 2:
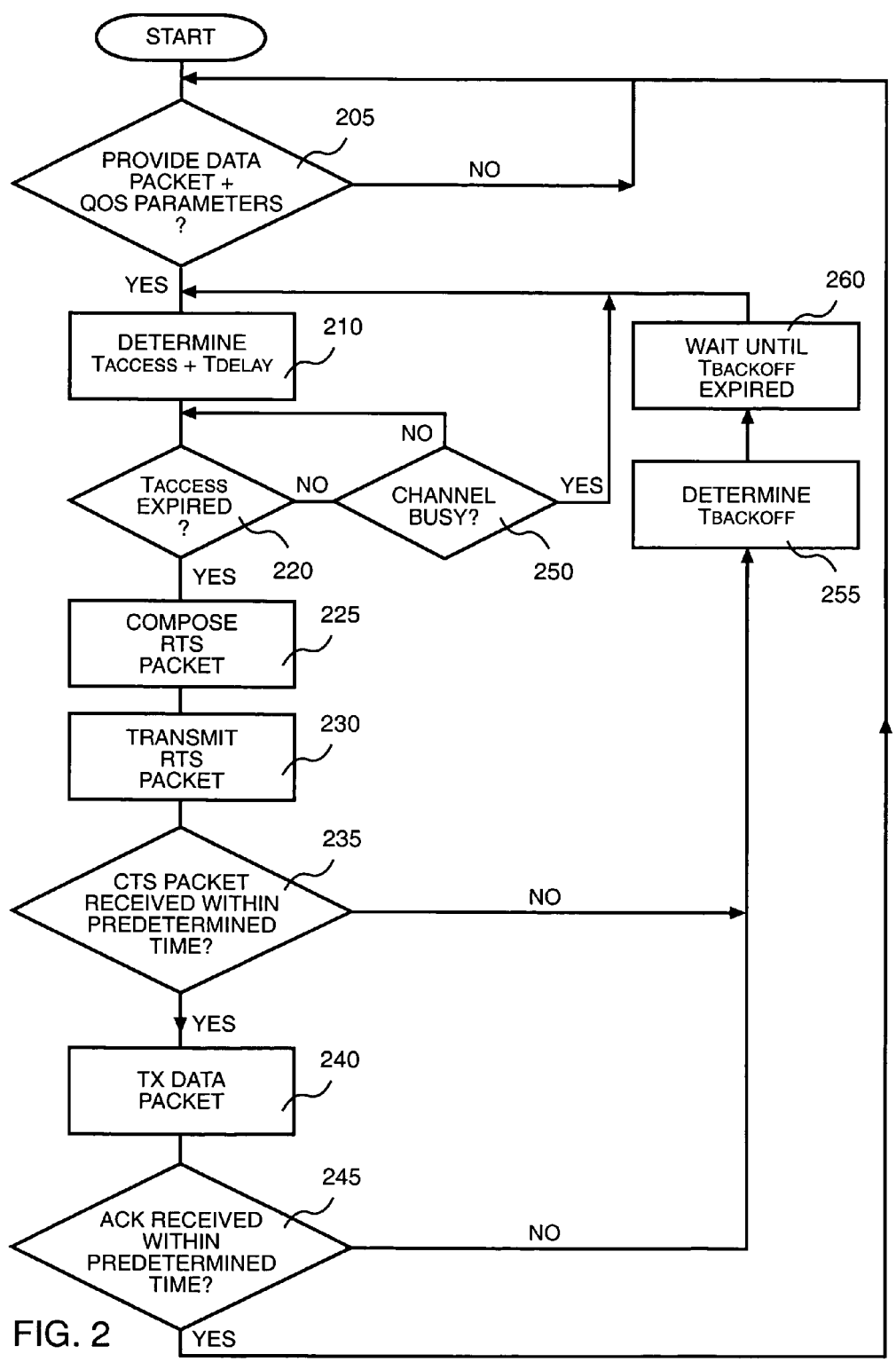
FIG. 2 shows a flowchart detailing operation of a communication unit in the communication system in FIG. 1 when transmitting data packets.

With additional reference to FIG. 2, the operation of the communication unit 110 when transmitting a data packet will now be described. When the communication unit 110 is not transmitting or receiving, the communication unit 110 monitors a common communication channel (not shown). When the communication unit 110 determines 205 that a data packet for transmission to the communication unit 105 and QOS parameters associated with the data packet have been provided by an upper layer, two transmission time parameters, $T_{access}$ and $T_{delay}$, as defined earlier, are determined 210 using the QOS parameters.

The common communication channel is then monitored 250 until time $T_{access}$ has elapsed 220. After $T_{access}$ has elapsed without any activity detected by the communication unit 110 on the common communication channel, the communication unit 110 composes 225 an RTS packet incorporating the time $T_{delay}$, and the RTS packet is transmitted 230 to the communication unit 105. Next, the communication unit 110 determines 235 whether a CTS packet is received from the communication unit 105 within a predetermined time. The predetermined time includes $T_{delay}$ and $T_d$. It can be estimated or calculated from the transmitter power, the distance and the characteristics of the propagation of radio waves in either open air or traversing walls, as well as the nature of the material in the wall, as is known by those skilled in the art.

However, if before the time $T_{access}$ lapses the communication unit 115 transmits an RTS packet, the communication unit 110 which is monitoring the common communication channel will, on detecting that RTS packet, determine 250 that the communication channel is busy, and will then return to the step of determining 210 new values of $T_{access}$ and $T_{delay}$. The new values of $T_{access}$ and $T_{delay}$ will take into account the QOS parameters and the time that has elapsed since the data packet was provided for transmission.

When a CTS packet is received 235 from the communication unit 105, the data packet is transmitted 240 to the communication unit 105. However, when a CTS packet is not received 235 from the communication unit 105, the communication unit enters a backoff process.

The backoff process comprises determining 255 a time $T_{backoff}$, and waiting 260 for the time $T_{backoff}$ to expire before returning to the step of determining 210 a new $T_{access}$ and $T_{delay}$, and proceeding to monitor 250 the communication channel once again for a time 220 defined by new $T_{access}$. The time $T_{backoff}$ and the new values of $T_{access}$ and $T_{delay}$ are computed using the QOS parameters and the time that has elapsed since the data packet was provided for transmission.

After transmitting 240 the data packet to the communication unit 105, the communication unit 110 determines 245 whether an ACK packet is received from the communication unit 105 within a predetermined time. The predetermined time includes $T_d$.

When an ACK packet is received 245 from the communication unit 105, the ACK packet provides confirmation to the communication unit 110 that the data packet has been successfully received by the communication unit 105, and the communication unit 110 returns to determining 205 whether another data packet and associated QOS parameters have been provided for transmission.

However, when an ACK packet is not received 245 from the communication unit 105, the communication unit 110 concludes that a collision has occurred and that therefore the data packet has not been transmitted successfully. The communication unit 110 then enters the backoff process 255 and 260 as described above.

Figure 3:
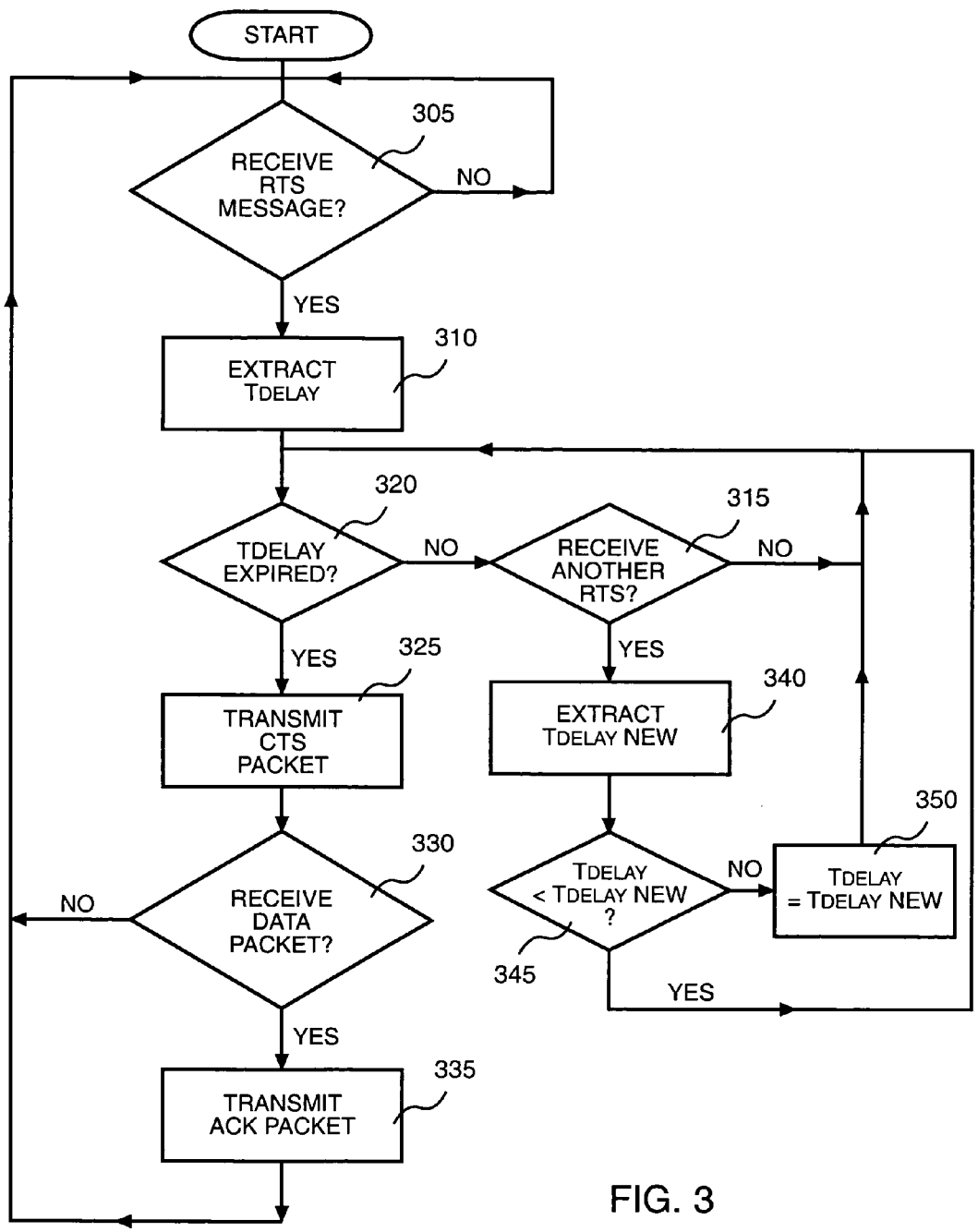
FIG. 3 shows a flowchart detailing operation of a communication unit in the communication system in FIG. 1 when receiving data packets.

With particular reference to FIG. 3, the operation of the communication unit 110 when receiving a data packet will now be described. As described earlier, when the communication 110 is not transmitting or receiving data packets, the communication unit 110 monitors the common communication channel. When the communication unit 110 receives 305 an RTS (105) packet from, for example, the communication unit 105, the information $T_{delay}$ (105) is extracted 310 from the RTS (105) packet.

The communication unit 110 then monitors the common communication channel for receipt 315 of any other RTS packets for the period 320 of time $T_{delay}$ (105). When no other RTS packets are received during the time $T_{delay}$ (105), the communication unit 110 transmits 325 a CTS (105) packet to the communication unit 105.

Alternatively, when another RTS (115) packet is received 315 from, for example the communication unit 115, before time $T_{delay}$ (105) has elapsed, the $T_{delay}$ (115) is extracted 340 from the later RTS (115) packet, and compared with the $T_{delay}$ (105) of the earlier RTS (105) packet to determine 345 whether the earlier $T_{delay}$ (105) is less than the later $T_{delay}$ (115). If $T_{delay}$ (105) is less than the later $T_{delay}$ (115), then the communication unit 110 waits until time $T_{delay}$ (105) elapses and then transmits 325 the CTS (105) to the communication unit 105, as described earlier.

However, when $T_{delay}$ (105) is not less than the later $T_{delay}$ (115), the communication unit 110 changes 350 the delay time $T_{delay}$ from $T_{delay}$ (105) to $T_{delay}$ (115). The communication unit 110 will now wait until time $T_{delay}$ (115) elapses before transmitting a CTS (115) packet to the communication unit 115. In this way, a number of RTS packets may be received by the communication unit 110 from a number of communication units during time $T_{delay}$ (105) but the RTS from the communication unit that provides the shortest $T_{delay}$ will receive a CTS packet from the communication unit 110. This means that the station with the most urgent application i.e. the one with the shortest $T_{delay}$ will preempt all other stations and have its data packets communicated with a higher priority.

If in response to transmitting a CTS (105) packet the communication unit 110 receives 330 a data packet, the communication unit 110 transmits 335 an ACK packet to the communication unit 105, and then returns to monitoring 305 the common communication channel for receipt of RTS packets. The transmission of the ACK packet provides an indication to the communication unit 105 that the data packet was successfully received.

Alternatively, when the data packet is not received 330 by the communication unit 110 within a predetermined time, the communication unit 110 concludes that a collision has occurred, and returns to monitoring 305 the common communication channel for receipt of RTS packets.

Figure 4:
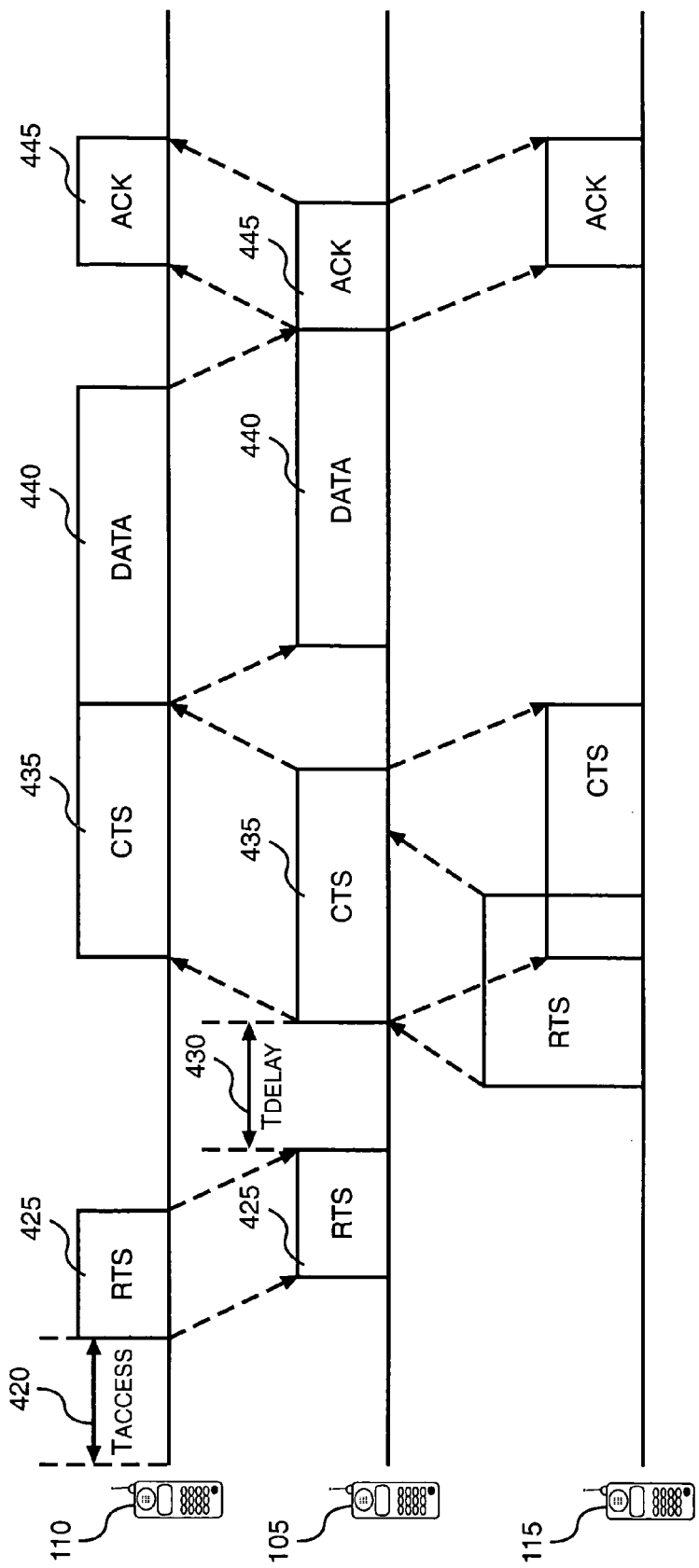
FIG. 4 shows a timing diagram of the communication system in FIG. 1.

With particular reference now to FIG. 4, determination of $T_{access}$ and $T_{delay}$ will now be further described in the communication system 100. The three communication units 105, 110 and 115 are shown, each with a corresponding timeline to illustrate the timing relationship between control packets, RTS, CTS and ACK, and data packets, that are communicated between the communication units 105, 110 and 115 in the communication system 100.

Note that the timing conditions (1) and (2), as listed earlier, are adopted from the FAMA-NCS protocol so that although the communication unit 115 is hidden from communication 105, and thus communication unit 115 does not receive an RTS packet transmitted by communication unit 105, if communication unit 115 transmits an RTS packet that at most collides with a CTS packet transmitted from communication unit 110 to communication unit 105, the timing conditions (1) and (2) ensure that communication unit 115 receives at least the trailer of the CTS packet, and thus communication unit 115 would abort any transmission and enter the backoff process. Consequently, a data packet can be transmitted from communication unit 105 to communication unit 110 collision free.

As described above, when the communication unit 110, has a data packet 440 to transmit to the communication unit 105, the communication unit 110 monitors the common communication channel, and waits until it senses that the common communication channel has been idle, i.e. not in use by any other communication unit, for a predetermined period of time $T_{access}$ 420. Only after the common communication channel has been idle for time $T_{access}$ 420 can the communication unit 110 transmit an RTS packet 425 on the common communication channel.

One method for determining time $T_{access}$ 420 is given by ALGORITHM 1 below. However, it will be appreciated by those skilled in the art that other QOS parameters than the PLR and the delay ($T_{left}$) can be used in the algorithm to calculate $T_{access}$.

IF (nrtpacket or rtPacket with $T_{left}$>1 sec) THEN $T_{access}=2*T_d$

ELSE
   IF ($T_{left}$>0) THEN $T_{access}=T_{left}-(N_{lost}-PLR*N_{sent})*T_{max}$ IF $T_{access}$<0 THEN $T_{access}=0$

ELSE $T_{access}=2*T_d/\text{llog}_2(T_{access}/2)$

END IF
   END IF
END IF

Algorithm 1

The calculation of time $T_{access}$ using ALGORITHM 1 is based on QOS parameters associated with the data packet to be transmitted, and on perceived QOS parameters. In ALGORITHM 1, the QOS parameter is the PLR component while the perceived QOS parameters are the $N_{lost}$ and $N_{sent}$ components in the equation below $T_{access}=T_{left}-(N_{lost}-PLR*N_{sent})*T_{max}$ In order to reduce waste of bandwidth caused by time $T_{access}$, time-sensitive packets, i.e. rtpackets, which have a time to live (time within which the data packet has to be delivered) of more than one second, compete at the same priority level as the non-time sensitive packets, i.e. nrtPackets. The rtPackets would gain higher priority when they become more urgent with the passage of time. For example, when a data packet has been subject to one or more backoff times. Initially, at an rtpacket's first attempt, the time $T_{left}$ is initialized to a value equal to the maximum tolerable delay of the data packet. Subsequently, time $T_{left}$ decreases with the passage of time. Alternatively, the time $T_{left}$ is initialized to a value which is proportional to the maximum tolerable delay of the data packet. Then, subsequently, time $T_{left}$ decreases with the passage of time in the same proportion. The equation, $$T_{access}=T_{left}-(N_{lost}-PLR*N_{sent})*T_{max}$$

from ALGORITHM 1 shows that the more the communication unit 110 suffers excess dropped packets, i.e.

$$N_{lost}-PLR*N_{sent}$$

the shorter time $T_{access}$ will be. Thus, when two of the communication units 105, 110 and 115 attempt to access the common communication channel simultaneously, time $T_{access}$ will tend to differentiate their attempts according to QOS parameters of the data packets to be communicated.

When the communication unit 110 succeeds in getting access to the common communication channel, the communication unit 110 determines time $T_{delay}$ 430, the value of which is then incorporated in the RTS packet 425, and the RTS packet 425 is then transmitted to the communication unit 105. The value of $T_{delay}$ 430 indicates how long the intended receiver, the communication unit 105, waits before replying to the communication unit 110 with a CTS packet 435. The method for determining time $T_{delay}$ 430 is given by ALGORITHM 2 below. However, it will be appreciated by those skilled in the art that other algorithms that use the QOS parameters can be used to calculate $T_{delay}$ 430.

IF (nrtpacket) THEN $$T_{delay}=2*T_{rts}$$

ELSE
   IF ($T_{left}/T_{max}>2$) THEN $$T_{delay=2}*T_{rts}$$

ELSE $$T_{delay}=(T_{left}/T_{max})*T_{rts}$$

ENDIF
ENDIF

Algorithm 2

From ALGORITHM 2, the component $T_{left}/T_{max}$ in the equation $$T_{delay}=(T_{left}/T_{max})*T_{rts}$$

reduces when the time $T_{left}$ reduces. Therefore, time $T_{delay}$ 430 reduces when time $T_{left}$ reduces with the passage of time. The result is, when the CTS packet 435 has not been transmitted and the time left i.e. $T_{left}$ to transmit the CTS packet 435 is getting shorter, the time which the receiving communication unit 105 is allowed to wait i.e. $T_{delay}$430, before transmitting the CTS packet 435 to the communication unit 110, is made shorter to reduce the probability of another communication unit 115 gaining access to the common communication channel during the time $T_{delay}$ 430. Or to put it another way, the shorter time $T_{delay}$ 430 increases the probability that the communication unit 105 will gain access to the common communication channel, relative to the other communication unit 115.

After the communication unit 110 receives the CTS packet 435, the communication unit 110 transmits a data packet 440 to the communication unit 105, and when the data packet 440 is successfully received by the communication unit 105, the communication unit 105 transmits an ACK packet 445, which is received by the communication unit 110.

It will be noted that there is a time lag between the transmission and receipt of the control packets RTS 425, CTS 435 and ACK 445 and the data packet 440 between the communication units 105 and 110. This is caused by the propagation delay time between the communication units.

Figure 5:
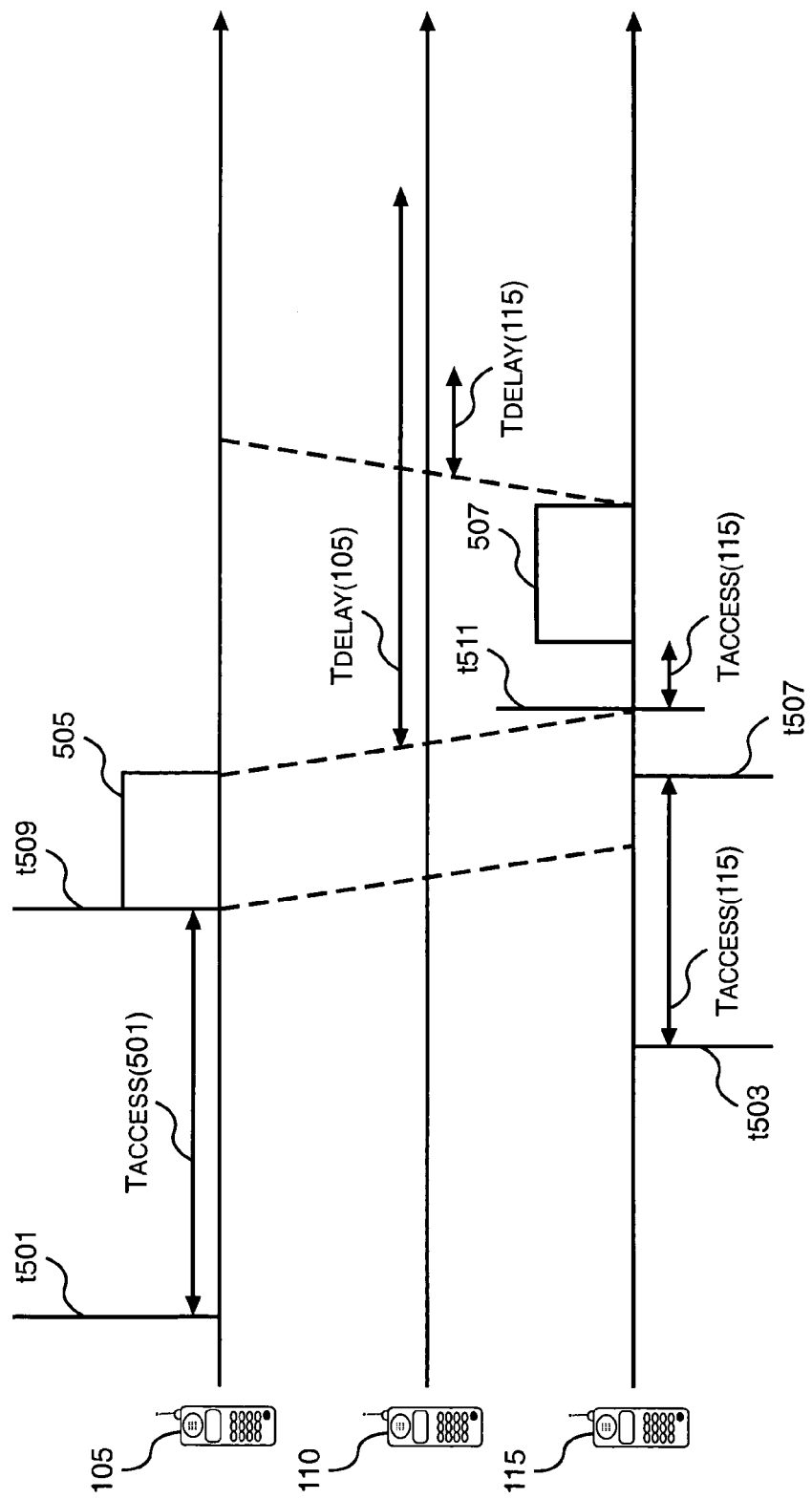
FIG. 5 shows another timing diagram of the communication system in FIG. 1.

With reference now to FIG. 5, a description of what occurs when the two communication units 105 and 115 attempt to communicate with the communication unit 110, now follows. At the communication unit 105, a data packet (not shown) is provided for transmission to the communication unit 110 at time t(501), while at the communication unit 115, another data packet (not shown) is provided for transmission to the communication unit 110 at time t(503), which is later than time t(501). Due to the lack of a global coordinator in the communicating system 100, and the lack of a global state, the communication unit 115 will not be able to successfully transmit an RTS packet 507 to the communication unit 110 before the communication unit 105 transmits an RTS packet 505. This is because, $$t(503)+T_{access}(115)>t(501)+T_{access}(105)$$

where $T_{access}$ (105) is the access time associated with the data packet at the communication unit 105; and
where $T_{access}$ (115) is the access time associated with the data packet at the communication unit 115.

Hence, the communication unit 115 is ready to transmit the RTS packet 507 at time t(507) which is later than time t(509), the time at which the communication unit 105 is ready to transmit the RTS packet 505.

However, when the QOS parameters of the data packet (not shown) which the communication unit 115 wishes to transmit to the communication unit 110 has a higher priority, the result is that the $T_{delay}$ (115) provided with the RTS packet 507 transmitted by the communication unit 115, is significantly shorter than the $T_{delay}$ (105) provided with the RTS packet 505 transmitted by the communication unit 105. Or simply put, the resultant delay target of the transmission from the communication unit 115 is more stringent than that from the communication unit 105.

Consequently, the communication unit 105 sets a value $T_{delay}$ (105) in the RTS 505 packet which tells the communication unit 110 the amount of time it can wait before replying with a CTS packet. After the communication unit 115 receives the end of the RTS packet 505 at time t(511), the communication unit 115 will apply the same procedure it uses for the first attempt at accessing the common communication channel, however, this time employing the remaining time.

Hence, the communication unit 115 will wait until time t(511) when it senses the common communication channel is idle, and will then determine $T_{left}$ and $T_{access}$ as described in Algorithm 1. In FIG. 5, the time interval between t507 and the start of RTS 507 is the new $T_{access}$ 115 calculated by the communication unit 115.

If time $T_{left}$ is less than time $T_{delay}$ (105), i.e., if the communication unit 115 access timer expires before the access timer of the communication unit 110 replies with a CTS to the communication unit 105, then the communication unit 115 can transmit the RTS packet 507 to the communication unit 110 that will preempt the RTS packet 505 from the communication unit 105.

In this way, although the communication unit 105 succeeded in transmitting the RTS packet 505 before the communication unit 115 transmitted the RTS packet 507, the communication unit 115 has the possibility to preempt the communication unit 105 and gain access to the common communication channel before the communication unit 105 starts transmitting its data packet (not shown).

When calculating time $T_{delay}$ for an rtPacket, only time $T_{left}$ is used. This is because $T_{left}$ is a composite value affected by both packet delay and packet drop ratio. Therefore, an RTS packet for a data packet that is more delay sensitive will have a shorter $T_{delay}$ when the data packet is about to expire. The present method will permit data packets to gain higher priorities after they are delayed for some time.

Communication units usually do not reply with a CTS packet immediately after receiving an RTS packet, unless required to do so, therefore a communication unit may receive multiple RTS packets. If the RTS packets which arrive later require shorter delays than that of the earlier received RTS packets, a communication unit can reply to the respective originating communication unit with the shortest delay first. This makes it possible for delay sensitive data packets to preempt other data packets. In addition, in this embodiment of the invention, time $T_{delay}$ does not exceed two times an RTS packet transmission time to minimize communication overhead.

Control packets may collide with each other, therefore communication units that detect collisions should wait for $T_{defer}$ and then back off for a random time $T_{backoff}$, which is calculated as shown below in ALGORITHM 3, where U(0,x) is a uniformly distributed random number in the interval 0 to x.

IF (nrtpacket or rtPacket with $T_{left}/T_{unit}$>Maxtimer) THEN $T_{backoff}=U(0, \text{Maxtimer})*2T_d$

ELSE $T_{backoff}=U(0, T_{left}/T_{unit})*2T_d$

END IF

Algorithm 3

The value of Maxtimer is set to a large value, for example 800, which is comparable to the maximum timer used in the DFWMAC protocol. $T_{backoff}$ is based on a uniform distribution whose upper bound value varies according to the delay requirement of a data packet. This calculation will statistically give a communication unit that has delay sensitive data packets a shorter $T_{backoff}$. Therefore, on average, such a communication unit will end the backoff period earlier than other communication units and attempt to gain access to the common communication channel again.

To illustrate how $T_{backoff}$ contributes in differentiating communications from the communication units, we refer again to FIG. 5. When the communication units 105 and 115 are hidden from each other, the communication unit 115 will not be aware of the RTS packet 505 transmitted by the communication unit 105. Consequently, after time $T_{access}$ (115) has elapsed, the communication unit 115 will transmit the RTS packet 507. The RTS packet 505 and the RTS packet 507 will collide when both are received at the communication unit 110.

After waiting for time $T_{delay}$ (105) and $T_{delay}$ (115) to elapse and not receiving a CTS packet, the communication units 105 and 115, respectively, determine that a collision has occurred, and both of the communication units enter the backoff process, as was mentioned earlier. The backoff process involves determining $T_{backoff}$(105) and $T_{backoff}$(115) and using the ALGORITHM 3 above with their respective QOS parameters, which are incorporated into the $T_{left}$ component. In this example, the QOS at the communication unit 115 results in data packet at the communication unit 115 having a higher priority relative to the data packet at the communication unit 105. This causes the $T_{backoff}$(115) to be computed from a smaller interval of the uniform distribution of backoff time, than the $T_{backoff}$(105). Consequently, the probability of the communication unit 115 terminating its backoff time before the communication unit 105 is higher, and the communication unit 115 is statistically more likely to gain access to the common communication channel.

Figure 6:
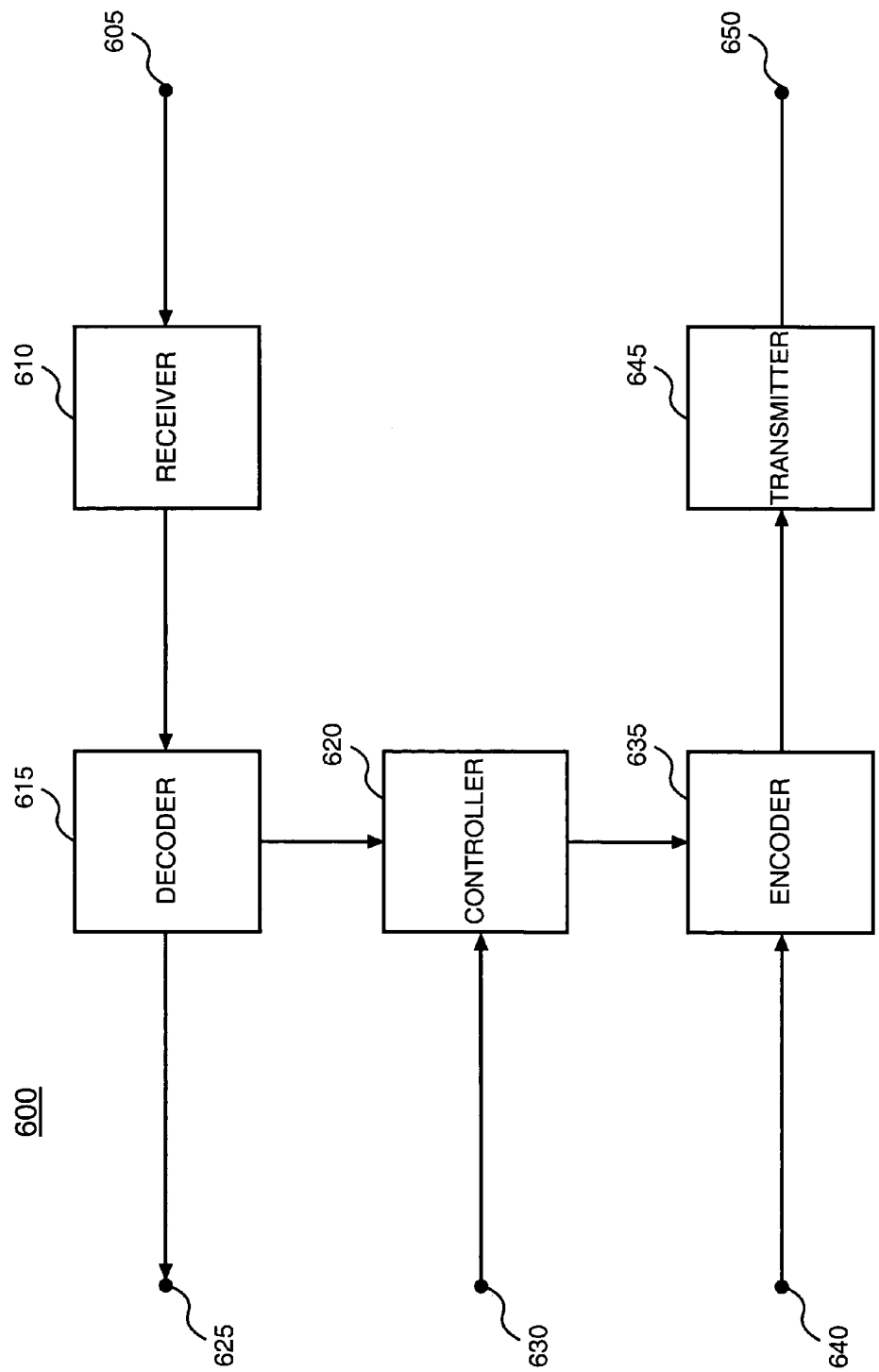
FIG. 6 shows a communication unit in the communication system in FIG. 1.

In FIG. 6, a communication unit 600 for operating on the communication system 100 includes an input terminal 605 for receiving control and data packets on a common communication channel (not shown). The input terminal 605 is coupled to a wireless receiver 610, which typically comprises the receiving part of a transceiver. The wireless receiver 610 receives an RF signal and the signal is demodulated and provides the incoming control and data packets to a decoder 615. It should be noted that no particular coding or modulation scheme is addressed here, as we are concerned with the medium access control protocol. The modulation or coding relates to the physical layer.

The decoder 615 detects the incoming control packets and provides any incoming control packets to a controller 620, and provides the incoming data packets to a data output 625.

The controller 620 receives the control packets from the decoder 615 and has an input coupled to a QOS input 630 for receiving at least one QOS parameter. In addition, the controller 620 monitors the common communication channel for activity via the decoder 615. The controller 620 generates outgoing control packets in accordance with the at least one QOS parameter, the incoming control packets, and whether there is activity on the common communication channel.

The controller 620 provides the outgoing control packets to an encoder 635. The encoder 635 has another input coupled to a data input 640 for receiving outgoing data packets for transmission. For each of the outgoing data packets that are provided to the encoder 635 there may be corresponding QOS parameters which are provided to the controller 620.

The encoder 635 has an output that provides the outgoing control packets and the outgoing data packets to a wireless transmitter 645, which transmits the outgoing control and data packets via an output terminal 650 on the common communication channel. The wireless transmitter 645 comprises the transmitting part of a transceiver. The input terminal 605 and the output terminal 650 can be coupled to a common antenna.

The communication unit comprises a mobile data terminal which includes both a communications interface and software. The communication interface comprises a transceiver, controller, and encoders as described earlier in FIG. 6. The communication software may comprise a layered protocol stack such as Asynchronous Transfer Mode (ATM) or TCP/IP, where the application layer provides the QOS parameters at the initiation of a communication session. QOS parameters comprise metrics which characterize the quality of the communication during a session or on a packet by packet basis. The QOS parameters can include a packet loss ratio which defines the percentage of packets that can be allowed to be dropped or lost; the delay each packet should not exceed; and delay variation from one packet to another.

The present invention, as described, provides a distributed multiple access communication system which addresses both the hidden terminals problem and takes into account the requirements of communicating time sensitive data packets to support realtime applications.

This is accomplished by controlling access to a common communication channel based on priorities of data packets queued at the communication units using three timers calculated according to the QOS requirements of data packets at each communication unit. The first timer sets access time, the time a communication unit should wait after the communication channel becomes idle before transmitting an RTS packet. The access time is dynamically adjusted based on the QOS requirements. The second timer is carried in every RTS packet. It indicates how long the intended receiving communication unit can wait before replying with a CTS packet. Again, the second timer is dynamically adjusted. This allows an earlier sent RTS packet to be preempted by a later sent RTS packet having a higher priority data packet transmission request. The third timer indicates backoff time, the time that a communication unit should wait before retransmission when collision occurs. The backoff time is uniformly distributed, however the upper bounds of the distribution vary among communication units. Communication units that have higher priority packets have lower upper bounds. Therefore, they can statistically recover earlier than other communication units and attempt access to the common communication channel again. Communication units queued with non-realtime data packets, have a fixed large upper bound.

The present invention therefore provides a method and apparatus for communicating data packets on a common communication channel in a distributed multiple access wireless communication system, which overcomes, or at least reduces the above mentioned problems of the prior art.

It will be appreciated that although only one particular embodiment of the invention has been described in detail, various modifications and improvements can be made by a person skilled in the art without departing from the scope of the present invention.

We claim:

1. A communication unit for communicating data packets to another communication unit on a common communication channel in a distributed multiple access wireless communication system, the communication unit comprising:
   a) a data input for receiving at least one data packet for transmission to the another communication unit;
   b) a quality of service (QOS) input for receiving at least one quality of service parameter, wherein the at least one QOS parameter is associated with the at least one data packet;
   c) a wireless receiver coupled to receive incoming control and data packets on the common communication channel, and having an output for providing the control and data packets;
   d) a decoder having an input coupled to the output of the wireless receiver for receiving the incoming control and data packets, the decoder having a first output for providing the incoming control packets, and having a second output coupled to provide the incoming data packets to a data output;
   e) a controller coupled to the QOS input, the controller having an input coupled to the first output of the decoder for receiving incoming control packets, the controller for generating outgoing control packets in accordance with the at least one QOS parameter and the incoming control packets, and the controller having an output for providing the outgoing control packets;
   f) an encoder having a first input coupled to the output of the controller for receiving the outgoing control packets, the encoder having a second input coupled to the data input for receiving the at least one outgoing data packet, and the encoder having an output for providing the outgoing control packets and the at least one outgoing data packet; and
   g) a transmitter having an input coupled to the output of the encoder for receiving the outgoing control packets and the at least one outgoing data packet, and the transmitter having an output adapted to transmit the outgoing control packets and the outgoing at least one data packet on the common communication channel.

2. A communication unit in accordance with claim 1 wherein the at least one QOS parameter comprises perceived QOS parameters.

3. A communication unit in accordance with claim 2 wherein the perceived QOS parameters include number of packets lost in prior transmissions to the another communication unit.

4. A communication unit in accordance with claim 2 wherein the perceived QOS parameters include ration of numbers of data packets lost in prior transmissions to the another communication unit to number of data packets sent.

5. A communication unit in accordance with claim 1 wherein the wireless communication unit comprises a radio frequency communication unit.

6. A communication unit in accordance with claim 1 wherein the decoder comprises a control packet detector for detecting the incoming control packets.

7. A communication unit in accordance with claim 1 wherein the controller comprises a control packet decoder for determining transmission parameters from the incoming control packets.

8. A communication unit in accordance with claim 1 wherein the controller comprises a control packet generator for determining which of a plurality of control packets to generate, and for determining at least one transmission parameter for inclusion in at least one of the generated control packets.

9. A communication unit in accordance with claim 1, wherein the controller comprises a translator for translating the at least one QOS parameter into at least one transmission parameter.

* * * * *